United States Patent [19]
Mund et al.

[11] Patent Number: 5,251,728
[45] Date of Patent: Oct. 12, 1993

[54] HYDRAULIC VIBRATION DAMPER OR SHOCK ABSORBER WITH ELECTRICAL CONTROL CONNECTIONS AND CONNECTOR THEREFOR

[75] Inventors: Jochen Mund, Eitorf; Wilfried Krämer, Windreck-Rosbach, both of Fed. Rep. of Germany

[73] Assignee: BOGE AG, Eitorf, Fed. Rep. of Germany

[21] Appl. No.: 801,033

[22] Filed: Dec. 2, 1991

Related U.S. Application Data

[63] Continuation-in-part of Ser. No. 546,538, Jun. 9, 1990, abandoned.

[30] Foreign Application Priority Data

Jul. 5, 1989 [DE] Fed. Rep. of Germany ....... 3922043

[51] Int. Cl.⁵ .............................................. F16F 9/46
[52] U.S. Cl. ..................................... 188/299; 439/130; 439/34
[58] Field of Search ............... 188/299, 286, 313, 315, 188/322.13, 322.19; 280/707; 267/218; 439/130, 34

[56] References Cited

U.S. PATENT DOCUMENTS

| | | | |
|---|---|---|---|
| 3,731,542 | 5/1973 | Forsberg | 73/516 |
| 3,989,066 | 11/1976 | Sturman et al. | 137/624.2 |
| 4,104,921 | 8/1978 | Nissl | 73/517 R |
| 4,492,421 | 1/1985 | Ito | 339/59 R |
| 4,638,670 | 1/1987 | Moser | 73/658 |
| 4,723,640 | 2/1988 | Beck | 188/319 |
| 4,749,069 | 6/1988 | Knecht et al. | 188/299 |
| 4,749,070 | 6/1988 | Moser et al. | 188/299 |
| 4,846,318 | 7/1989 | Groves | 188/299 |
| 4,886,463 | 12/1989 | Scott et al. | 439/89 |
| 4,929,038 | 5/1990 | Reinartz et al. | 303/119 |
| 4,940,420 | 7/1990 | Munie | 439/272 |
| 4,960,188 | 10/1990 | Wössner | 188/299 |
| 4,974,707 | 12/1990 | Neumann et al. | 188/299 |

FOREIGN PATENT DOCUMENTS

| | | |
|---|---|---|
| 2038755 | 9/1971 | Fed. Rep. of Germany . |
| 3601616 | 7/1987 | Fed. Rep. of Germany . |
| 3800288 | 6/1989 | Fed. Rep. of Germany . |
| 3807913 | 7/1989 | Fed. Rep. of Germany . |

*Primary Examiner*—Robert J. Oberleitner
*Assistant Examiner*—Lee W. Young
*Attorney, Agent, or Firm*—Nils H. Ljungman & Associates

[57] ABSTRACT

A hydraulic vibration damper or shock absorber with electrical control connections and connector therefor which control a valve arrangement in the vibration damper or shock absorber. The valves, of the valve arrangement, are electrically operated. An electrical feed supplies electricity to a first valve and all other valves receive electrical signals from that first valve.

20 Claims, 7 Drawing Sheets

HYDRAULIC VIBRATION DAMPER OR SHOCK ABSORBER WITH ELECTRICAL CONTROL CONNECTIONS AND CONNECTOR THEREFOR

CROSS-REFERENCE TO RELATED APPLICATIONS

This application is a continuation-in-part application of co-pending application Ser. No. 07/546,538, filed Jun. 29, 1990 and now abandon, which claims priority from Federal Republic of Germany Patent Application No. P 39 22 043, filed Jul. 5, 1989, from which the instant application therefore also claims priority.

BACKGROUND OF THE INVENTION

1. Field of the Invention:

The present invention relates to hydraulic, adjustable vibration damper with electrical control and an electrical control for a valve arrangement for a hydraulic, adjustable vibration damper. The damper comprises a piston that is attached to a piston rod. The piston subdivides the work cylinder into two work chambers, each of which are filled with a damping medium, or fluid. A valve arrangement is, also, provided with at least two electromagnetically operated valves with an electric line connected to each.

2. Background Information:

Valve arrangements have been known. For example, German Laid Open Patent Application No. 36 01 616 discloses a valve arrangement comprising a plurality of individual elements, or valves. The individual valves are equipped with corresponding electrical connection lines. The connection lines are shown schematically in the above-mentioned German application, but no detailed reference to the specific electrical connection is shown.

OBJECT OF THE INVENTION

It is an object of the present invention to provide a valve arrangement with at least two magnetic valves and further, to provide each valve with a simple, secure electrical connection line that is protected against external influences, even if mounted in the area of the wheel housings of a vehicle.

SUMMARY OF THE INVENTION

The present invention achieves the above object by providing electrical connecting line ends in one valve. The connecting line provides wire leads, from the beginning of its associated valve, for all other associated valves.

This embodiment provides the advantage that the individual electrical connecting lines that are connected to the respective magnetic valves may be eliminated. Only one electrical line, is required for the entire valve arrangement and the connections to the individual magnetic valves within the valve arrangement, come from the electrical connection line and the first valve. This embodiment is especially advantageous for use in vibration dampers and associated magnetic valves. An advantageous mounting arrangement during the installation of the vibration dampers in vehicles, as well as an advantageous arrangement for stocking and warehousing of the connectors and shock absorbers are some of the further advantages provided by the present invention.

In another embodiment of the claimed invention, the connecting line and/or the feeder line are connected to the valves by means of plug connections.

In a further embodiment of the present invention, the connecting line and/or the feeder line is sprayed, or covered with an elastic material in the area adjacent to the valves. The advantage is that a flexible transition is provided for the connection line and for the feeder line for the magnetic valve.

In another embodiment of the present invention, the electrical connection line for one valve and the feeder lines for the remaining valves are arranged adjacent to and approximately parallel to each other.

In a further embodiment of the present invention, the electrical connection of the connection line and/or the feeder line occurs on the inside of the valves.

Another advantageous embodiment of the present invention is that the electrical connecting line and the feeder line are consolidated and connected electrically in a single plug connection. The connection, or branching can also occur in the plug of the electrical connecting line.

One aspect of the invention resides broadly in a valve system for an adjustable hydraulic vibration damper being electrically operated and including a first valve apparatus defining an interior area and having a first electrical input apparatus for receiving electrical signals and an electrical output apparatus for sending electrical signals therefrom, and a second valve apparatus having a second electrical input device for being electrically connected to and for receiving an electrical signal from said electrical output apparatus of the first valve apparatus. The valve system is configured in such a way that the first valve apparatus is adapted to receive a first control signal through the first electrical input apparatus; the first control signal is for controlling the first valve apparatus and the second valve apparatus; the first valve apparatus is adapted to be controlled by the first control signal; the second valve apparatus is adapted to receive a second control signal from the electrical output means of the first valve apparatus through the second input apparatus of the second valve apparatus; and the second valve apparatus is adapted to be controlled by the second control signal.

Another aspect of the invention resides broadly in an adjustable hydraulic vibration damper with an electrically operated valve system, the vibration damper comprising: a working cylinder with at least one damping fluid and a damping piston disposed therein; first solenoid valve apparatus connected to control flow of damping fluid in the vibration damper; second solenoid valve apparatus connected to control flow of damping fluid in said vibration damper; the first solenoid valve apparatus defining an interior area and having first electrical input means for receiving electrical signals; the first solenoid valve apparatus having electrical output means for sending electrical signals therefrom; and the second solenoid valve apparatus having second electrical input for being electrically connected to and for receiving an electrical signal from the electrical output apparatus of the first valve apparatus; the valve system being configured wherein; the first valve apparatus is configured to receive a first control signal through the first electrical input apparatus, the first control signal for controlling the first valve apparatus and the second valve apparatus; the first valve apparatus is configured to be controlled by the first control signal; the second valve apparatus is configured to receive a second control signal from the electrical output apparatus of the first valve apparatus through the second input apparatus of the second valve apparatus; and the second valve apparatus is configured to be controlled by the second control signal.

BRIEF DESCRIPTION OF THE DRAWINGS the following Description of the Preferred Embodiments may be better understood when taken in conjunction with the appended drawings in which.

Figure 5:
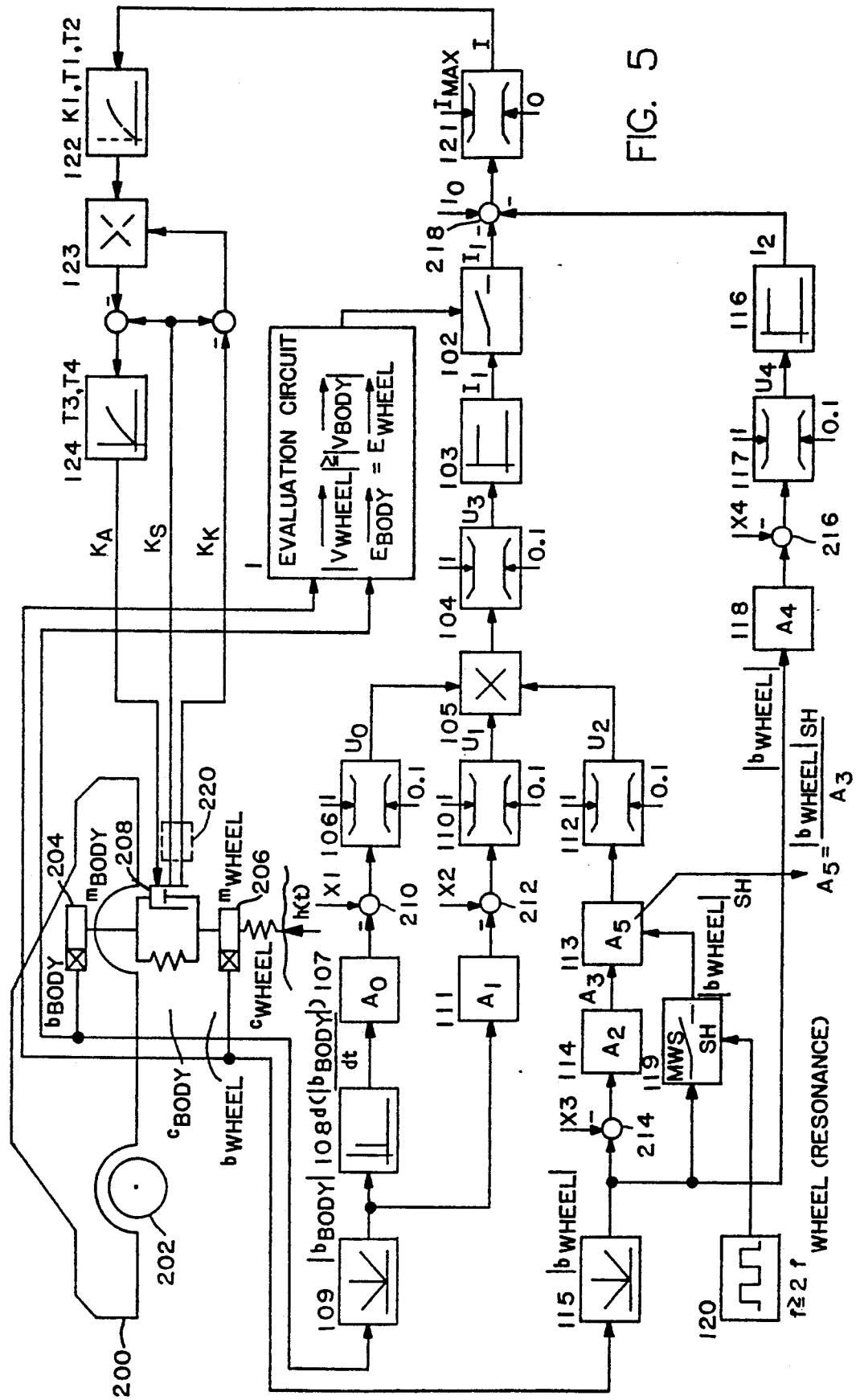
Figure 6:
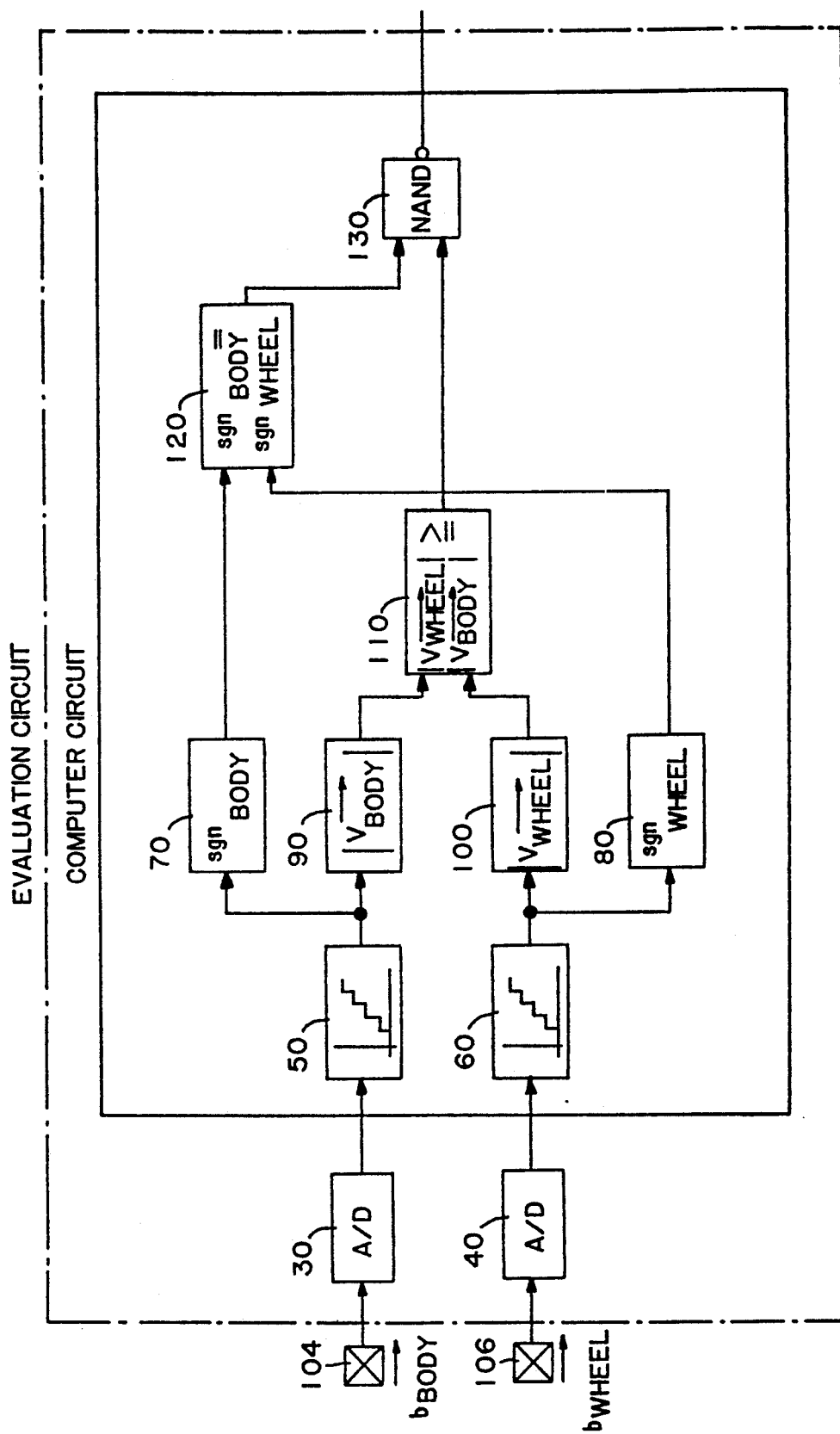

FIG. 5 schematically illustrates an apparatus for the control of a two mass system;

FIG. 6 illustrates an evaluation circuit for the processing of the velocity signals.

DESCRIPTION OF THE PREFERRED EMBODIMENTS

Figure 1:
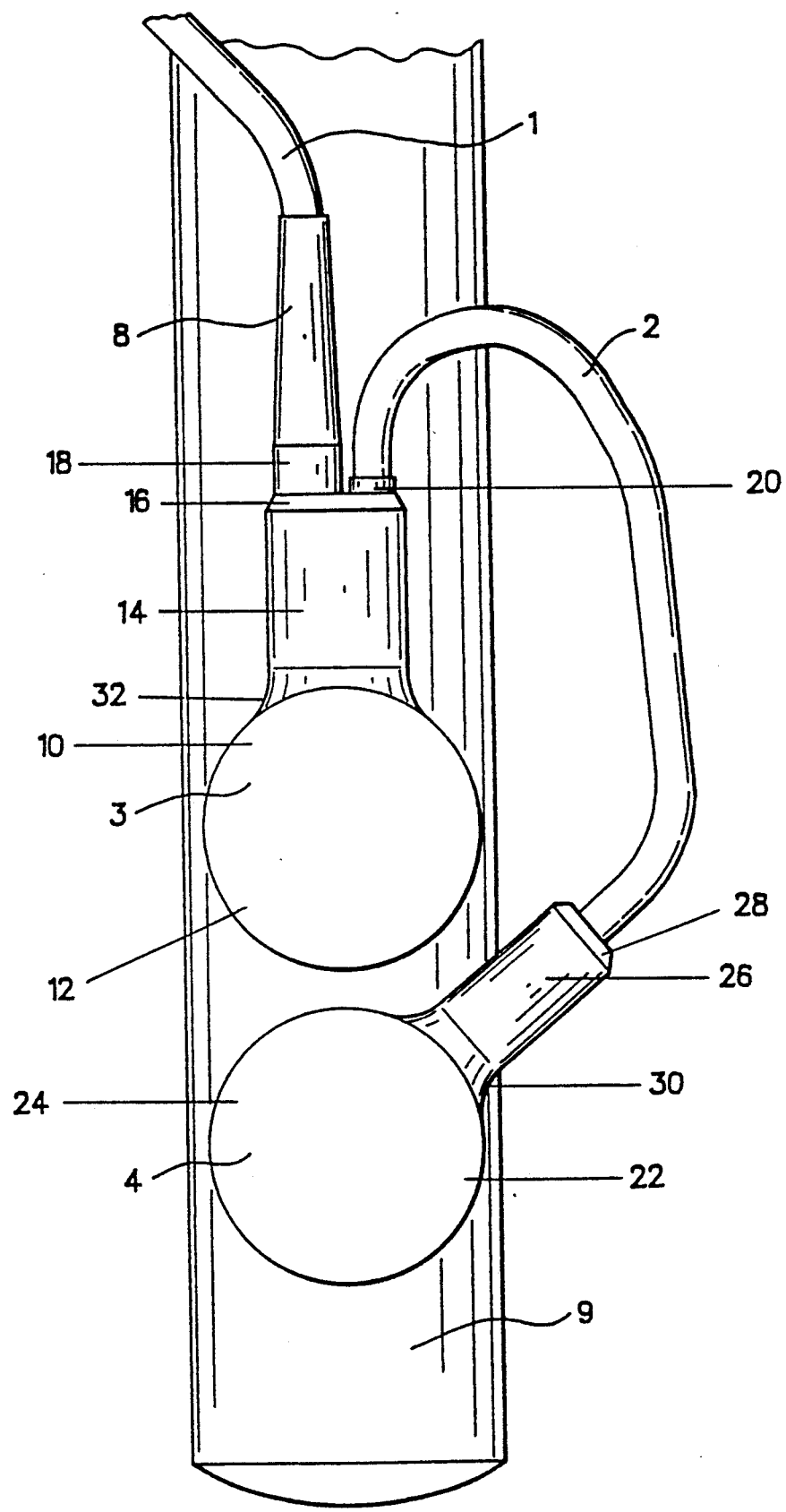
FIG. 1 is a side elevational view of a valve arrangement for a vibration damper that employs the present invention.

FIG. 1 shows vibration damper 9. Vibration damper 9 is equipped with two valves, 3 and 4, that can be operated by appropriate electromagnetic devices (not shown) such as solenoids to form solenoid valves. Valve 3 receives electrical signals from electrical connection line 1. From valve 3, feeder line 2 runs to valve 4 to provide valve 4 with electric energy. The transitional regions between valves 3 and 4 and electrical connection line 1 or feeder line 2 can, preferably, be covered with an elastic material in the vicinity of location 8 for the purpose of providing a connection that is resistant to buckling. Such an elastic material may preferbly be in the shape of a truncated conical elastomeric extension. The configuration of vibration damper 9, shown in FIG. 1, facilitates this mounting in a vehicle since the ends of electrical connection line 1 and feeder line 2 are approximately adjacent to one another in valve 3 on one side of the valve 3. With this type of electrical connection, it is possible to equip electrical connection line 1 with controlling wire leads for both valves 3 and 4 whereby electrical connection line 1 can be a common wire lead for the return lines for both valves 3 and 4. The electrical connection between valves 3 and 4, is preferably within the interior of valve 3. The connection between the valve 3 and the connection line 1 is made with an integral plug 10 where the lines are wired from the connecting line 1 to connect to the valve 3 and also connect through the plug 10 to the valve 4.

The plug 10 has a circular portion 12, preferably substantially adjacent to valve 3 and a radial, preferably cylindrical, portion 14 extending from the circular portion 12. As seen in FIG. 1, the radial portion 14 is beveled or chamfered at its upper region 16. The plug 10 preferably has a cylindrical support portion 18 extending upwardly therefrom to connect with the conical portion at location 8. The cylindrical portion 14 is positioned, as seen in FIG. 1, on the left side of the radial portion 14. The feeder line 2 extends from the right side of the radial portion 14 and has a smaller cylindrical support portion 20 than the support portion 18. The plug 10, and any other plugs, in an alternative embodiment, may be integral with the shock absorber or vibration damper 9.

Similarly, the valve 4, preferably, has a plug 22 generally equivalent in some ways to the plug 10. This plug 22 has a circular portion 24 which has a circular cylindrical portion 26 similar generally to the portion 14. The cylindrical portion 26 has a chamfered portion 28 into which the line 2 enters the plug 22. Both the portions 12 and 24 have fillets 30 and 32 between them and their radial portions 14 and 26. The cylindrical portion 26 extends about 45° upwardly away from the longitudinal center line of the shock absorber 9.

Figure 2:
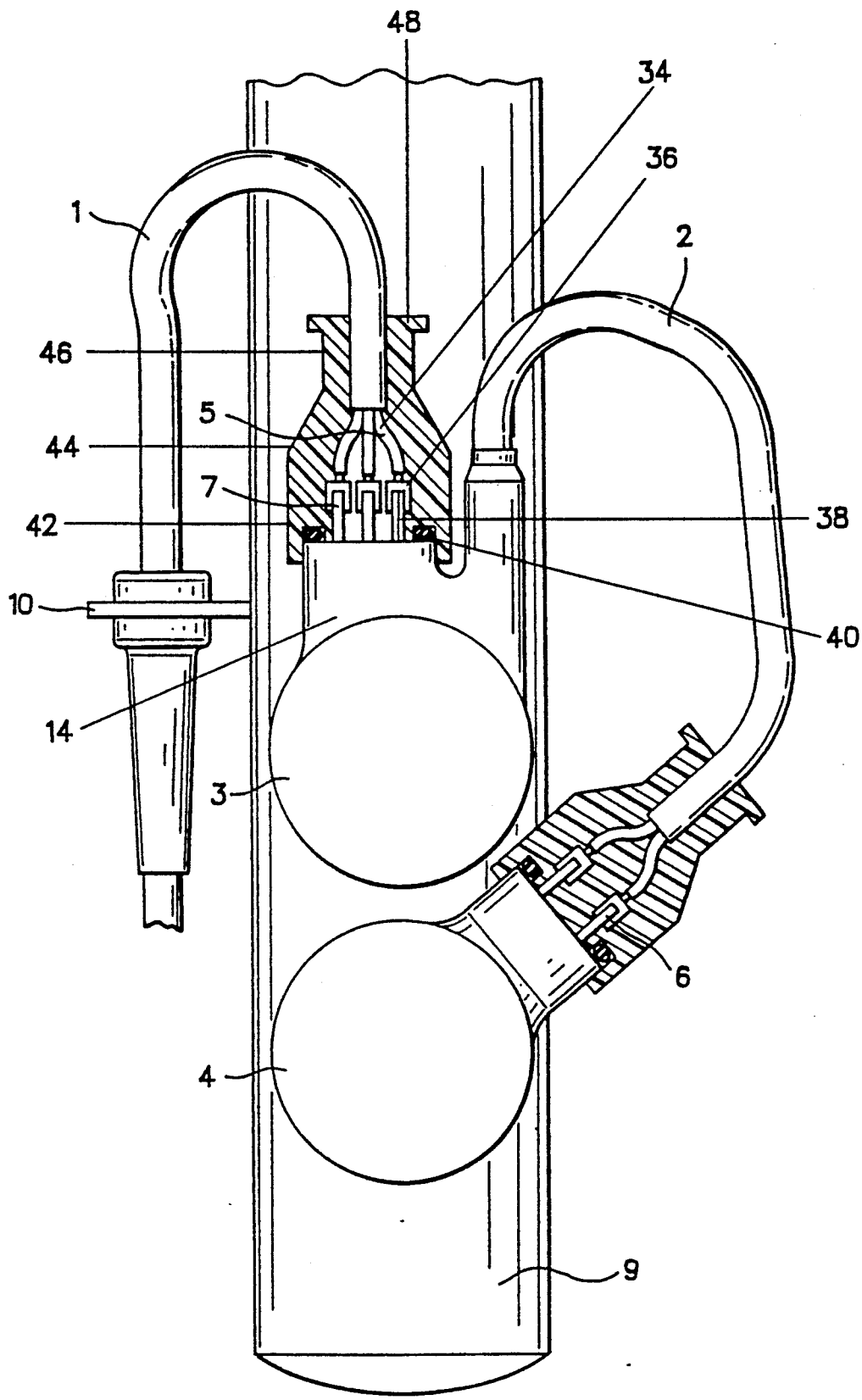
FIG. 2 is a side elevational view, partially in section, of another embodiment of a valve arrangement for a vibration damper that employs the present invention.

FIG. 2 shows another embodiment, of the present invention, wherein electric connection line 1 is connected to valve 3 by means of plug connection 7. The plug connection 7 has wires 34 connected to gripping contacts 36. These gripping contacts 36 grip preferably round male contacts 38. The plug connection 7 has a circular cylindrical seal 40 preferably in the form of a sealing ring for making a seal between the radial portion 14 and the plug connection 7.

The plug connection 7 has a cylindrical portion 42, a conical portion 44 adjacent the cylindrical portion 42 and another cylindrical portion 46 adjacent the opposite end of the cylindrical portion 42. The plug 7 also has a top, flared portion 48. The plug 6 has a similar, if not identical, structure as that of the plug 7. The structure shown in the FIGS. 1–3 comprises part of the disclosure with the angles, relative sizes and dimensions, and placements of any and all components incorporated into the disclosure as if all such angles, relative sizes and dimensions, and placements were set forth in complete detail herein.

Valve 4 is connected by feeder line 2 through plug connection 6. The remaining features of this embodiment of the present invention correspond to those shown in FIG. 1.

In the embodiment shown in FIG. 2, mounting bracket 10 is mounted to the outside pipe of vibration damper 9 for properly aligning electrical connection line 1 relative to vibration damper 9.

Figure 3:
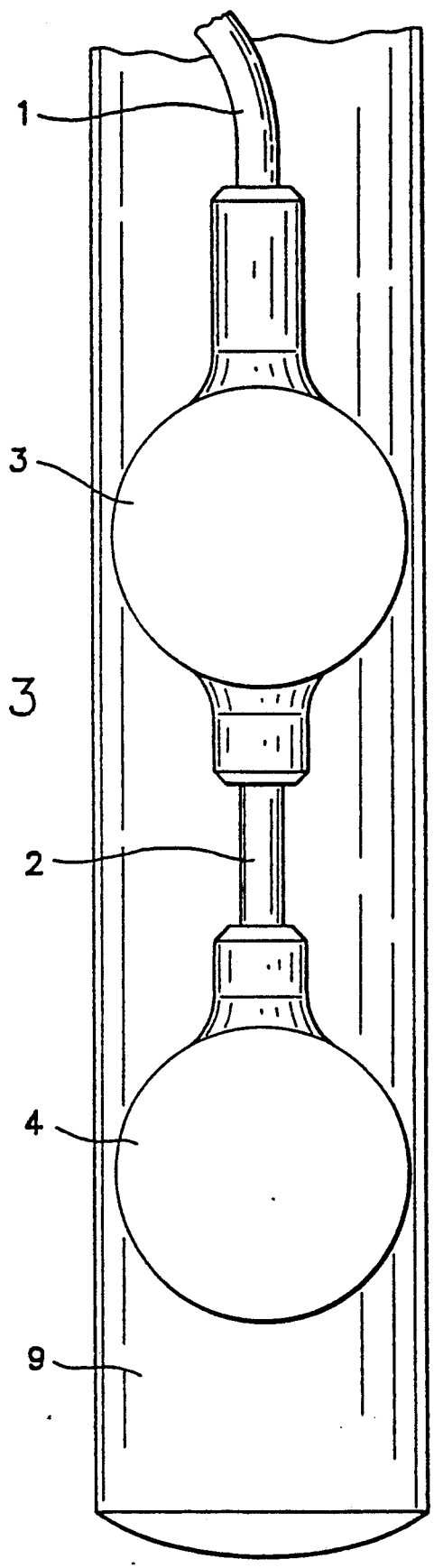
FIG. 3 is a side elevational view of another embodiment of a valve arrangement for a vibration damper that employs the present invention.

FIG. 3 shows vibration damper 9 and valves 3 and 4. Valve 3 is configured so that feeder line 2 makes a direct connection from valve 3 to valve 4. The structure of the plugs on the valves 3 and 4 is essentially identical to that of FIG. 1.

Figure 1A:
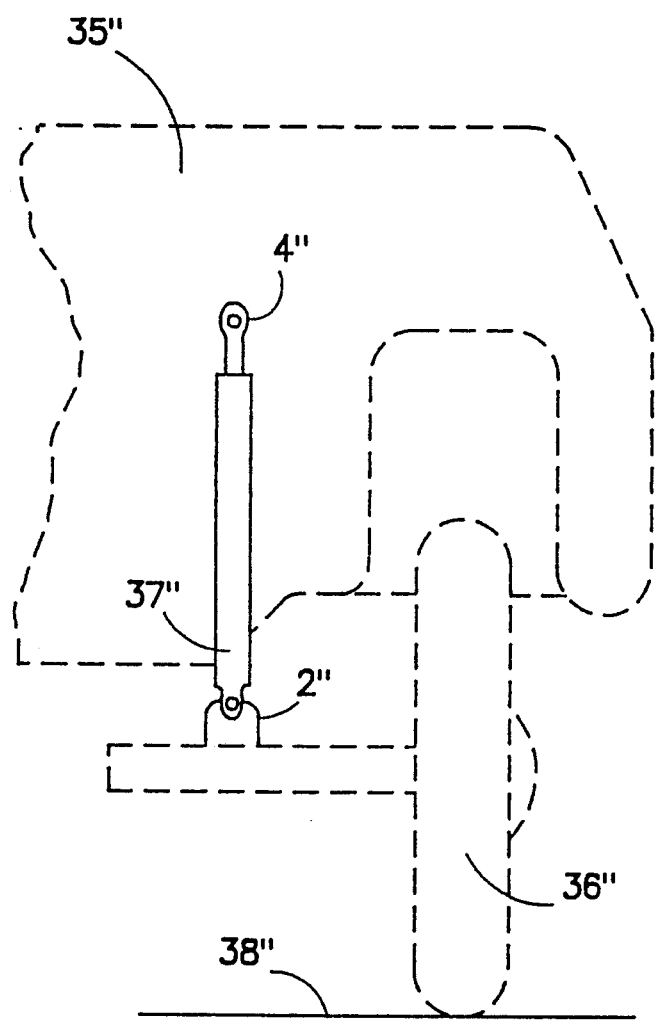
FIG. 1a is schematically shown an illustrative practical application of the vibration damping apparatus of the present invention in relation to a vehicle.

In FIG. 1a, there is schematically shown an illustrative practical application of the vibration damping apparatus of the present invention in relation to a vehicle including a vehicle body 35" having a support wheel 36". The hydraulic vibration damping apparatus 37" is shown with the upper coupling member 4" fastened to move with the vehicle body 35" and the lower coupling member 2" fastened to move with the wheel 36". As the vehicle body 35" travels along a roadway 38", the support wheel 36" will move relative to the vehicle body 35", and the damping apparatus 37" will operate to damp undesired vibrations and relative movements between the vehicle body 35" and the support wheel 36" in response to sensed relative movement between the vehicle body 35" and the support wheel 36".

Figure 4:
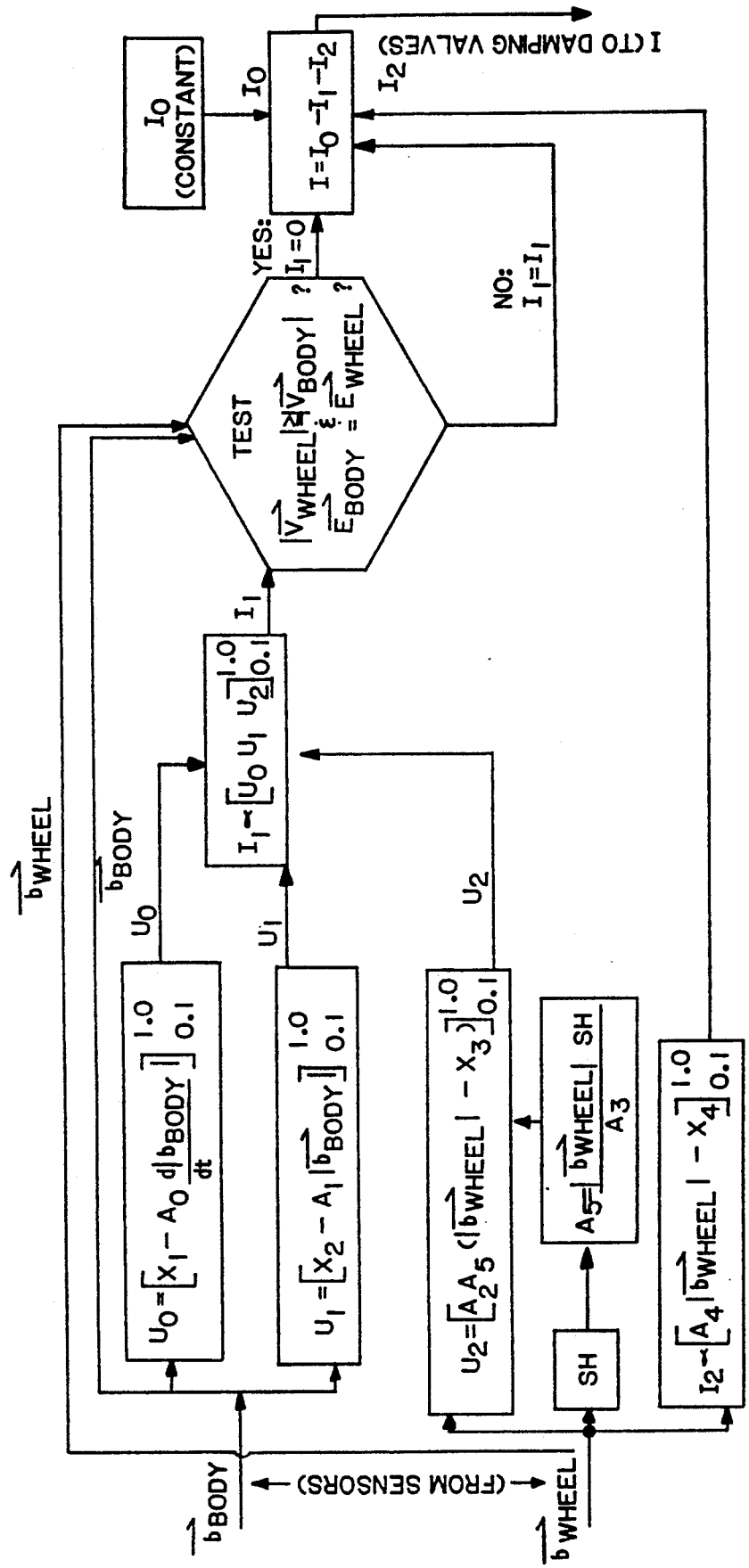
FIG. 4 is a schematic (or algorithmic) representation of a signal processing circuitry of the invention.

One situation in which the present invention may be used is discussed below. Referring to FIG. 4, signals indicative of the acceleration of the vehicle body $b_{body}$ and of the acceleration of the vehicle $b_{wheel}$ are utilized to derive therefrom signals indicative of damping force characteristics which are used to adjust vibration dampers included in a suspension system and are capable of exerting a variable damping force between the wheels and the body of a vehicle, to thereby substantially reduce the road shock transmitted to the body through the wheels.

Preferably, the sensor signals $b_{body}$ and $b_{wheel}$ are vector signals in the sense that they contain information indicative of not only the magnitude of acceleration of the respective vehicle part, but also the direction of such acceleration. For example, a positive signal could be used to indicate a vertically upward direction of acceleration, while a negative signal could be used to indicate a vertically downward direction of acceleration. Signals $b_{body}$ and $b_{wheel}$ might, for example, be generated by accelerometers, which are well known in the art and are described, for example, in U.S. Pat. No. 3,731,542, issued to Forsberg on May 8, 1973 and entitled "Optical Accelerometer" and U.S. Pat. No. 4,104,921, issued Aug. 8, 1978 to Nissl and entitled "Piezo Electric Acceleration Transducer", both patents of which hereby expressly incorporated by reference, with the same effect as if they were set forth in their entirety herein. An additional apparatus relating to variable vibration damping is disclosed in U.S. Pat. No. 4,638,670, issued on Jan. 27, 1987 to Moser and entitled "Apparatus for the Determination of the Distance Travelled by a Piston in a Cylinder", which is also hereby expressly incorporated by reference with the same effect as if the entire contents thereof were fully set forth herein.

It will be seen that, within the accompanying drawings, an arrow (i.e., "→") is sometimes employed to indicate a vector signal, i.e., a signal having both a magnitude and direction. Within the written portion of the specification, the use of a vector arrow has not been employed. However, the signals b, V and E should be understood to be vector signals, the magnitudes of these signals being indicated through the use of the absolute value symbol, e.g., "$|b_{body}|$."

As shown schematically in FIG. 4, the signal $b_{body}$ which is indicative of both the magnitude and the direction of acceleration of the vehicle body, is used to derive two intermediate signals $U_0$ and $U_1$, according to the transformations (e.g., formulas) 1) and 2) set forth below. It will be appreciated by those of ordinary skill in the art that the carrying out of these signal processing steps (or formulas) may be accomplished by various equivalent means, such as, for example, through the use of a microprocessor, a digital filter, or the like, in which case all of the signals discussed herein could be converted between analog and digital form through the use of analog to digital (A/D) and digital to analog (D/A) converters.

$$U_0 = \left[ X_1 - A_0 \frac{d|b_{body}|}{dt} \right]_{0.1}^{1.0} \quad 1.)$$

$$U_1 = [X_2 - A_1 |b_{body}|]_{0.1}^{1.0} \quad 2.)$$

wherein $|b_{body}|$ equals the absolute value or (magnitude) of the acceleration of the vehicle body, $$\frac{d|b_{body}|}{dt}$$

equals the first derivative of the absolute value of the vehicle body acceleration with respect to time, and $A_0$, $A_1$, $X_1$ and $X_2$ are appropriately chosen constants based upon the particular vehicle characteristics (size, weight, etc.), empirical testing, expected road conditions, and the like.

Another intermediate signal $U_2$, and an intermediate current $I_2$, are determined using the absolute value of the wheel acceleration, $b_{wheel}$, according to the following signal processing transformations 3) and 4):

$$U_2 = [A_2 A_5 (|b_{wheel}| - X_3)]_{0.1}^{1.0} \quad 3.)$$

$$I_2 \alpha [A_4 |b_{wheel}| - X_4]_{0.1}^{1.0} \quad 4.)$$

wherein $A_2$, $A_4$, $A_5$, $X_3$ and $X_4$ are once again appropriately determined constants.

The coefficient $A_5$ is determined according to the following formulation 5):

$$A_5 = \frac{|b_{wheel}|SH}{A_3} \quad 5.)$$

wherein the absolute value of $b_{wheel}$ SH is the absolute value of the wheel acceleration as determined by a sample and hold circuit, SH, and $A_3$ is, once again, an appropriately determined, substantially constant value.

Preferably, according to a well known sampling theorem, the sample and hold circuit, SH, is operated at a sampling frequency which is at least equal to or greater than twice the frequency of vibrations which design considerations determine should be taken into account, and are most preferably any known or expected resonance frequencies of the wheels. Additionally, the sample and hold circuit, SH, may include memory and comparator circuitry for determining and maintaining in memory the maximum wheel acceleration determined over an appropriate period of time.

Another intermediate current or signal $I_1$ is determined or produced in a proportional relationship to the product of the three intermediate signals $U_0$, $U_1$ and $U_2$ as follows:

$$I_1 \alpha [U_0 U_1 U_2]_{0.1}^{1.0} \quad 6.)$$

In the above formulas (or transformations) 1–4 and 6, the intermediate signals $U_0$, $U_1$, $U_2$, $I_1$ and $I_2$ are all subjected to a limiting process such that their values, in a preferred embodiment, are limited to between about 0.1 and about 1.0. Of course, other appropriate limits might be utilized, depending upon the limits of adjustment of the particular vibration damping apparatus employed, etc.

It will be seen from FIG. 4 that the actual value of the variable damping control signal I, transmitted to the vibration damping apparatus, is preferably determined according to the following relationship:

$$I = I_0 - I_1 - I_2 \quad 7.)$$

wherein $I_0$ is preferably a constant reference value, and wherein $I_1$ and $I_2$ preferably have values between 0.1 and 1.0 determined according to relationships 4) and 6)

set forth above. Also, preferably, the variable damping control signal is limited so as to be allowed to range only between the limits of about 0 and about $I_{max}$. Most preferably, the damping control signal I is an electrical current used to set the damping characteristics of variable damping vibration isolation apparatuses (or shock absorbers), the damping characteristics of which can be current controlled. In an embodiment wherein all or part of the above-described signals are derived via numerical computation by a microprocessor or the like, preferably, the final control signal I will be converted by means well known in the art, to a current having a relatively corresponding value. However, it will be appreciated that any other signal, digital or analog, such as a voltage signal, a binary numerical representation, etc. may be derived which reflects the relationships set forth above.

As noted in relationship 7)set forth above, the final control signal I is, in part, derived by reducing the reference control signal $I_0$ by the intermediate signal $I_2$, as reflected in transformation 4). The reference control signal $I_0$ is preferably further reduced by the intermediate signal $I_1$ to derive the final control signal I. However, a test is first conducted to determine whether the reference signal $I_0$ is to be so further reduced by the intermediate signal $I_1$.

A further example of such a test circuit or algorithm is more fully set forth in FIG. 6. However, and still referring to FIG. 4, it will be seen that, in brief, the actual vector values indicating both the direction and magnitude of the wheel acceleration and of the body acceleration are employed in a test circuit (or algorithm), wherein the following two conditions 8) and 9) are checked:

$$|V_{wheel}| \geqq |V_{body}|?; \text{ and} \qquad 8.)$$

$$E_{body} = E_{wheel}? \qquad 9.)$$

Specifically, tests are conducted to determine a) whether the absolute value of the wheel velocity is equal to or exceeds the absolute value of the body velocity, and b) whether the body and the wheel are both moving in the same direction. The values for the velocities of the wheel and body may be readily determined by integration of the acceleration signals, through means well known in the art, such as, for example, numerical integration via a microprocessor, or analog integration through the familiar circuit of a resistor and an amplifier connected in series, with a feedback capacitor connected across the amplifier.

If both conditions 8) and 9) are met, the intermediate signal $I_1$ is set to 0 and is not subtracted from the reference signal $I_0$ in determining the final damping control signal I. Since, in a preferred embodiment, the rigidity (or degree of stiffness) of the damping apparatus varies inversely with respect to the control signal I, satisfaction of both relationships 8) and 9) and of a corresponding setting of $I_1$ to 0 results in the setting of a relatively softer damping characteristic.

FIG. 5 is another schematic depiction of an example where the present invention may be utilized, wherein the various processing of signals set forth in equations 1)-9) above and illustrated algorithmically in FIG. 4 is preferably carried out, at least in part, using analog components and analog signals, such as, for example, current voltage, etc. Of course, it will be readily appreciated by one of ordinary skill in the art that the example, as shown in FIG. 5, can be equally well carried out employing other equivalent technology, such as, for example, digital processing techniques.

Referring again to FIG. 5, a vehicle equipped with the examples which may employ the present invention has a vehicle body 200 having a mass $m_{body}$ and a vehicle wheel 202 having a mass $m_{wheel}$. The interaction of the vehicle body and vehicle wheel with one another through a vibration damping apparatus having variable damping characteristics 208 is approached by considering the vehicle body to have a spring constant of $c_{body}$ and the wheel to have a spring constant of $c_{wheel}$. Two sensors (e.g., accelerometers) 204 and 206 generate vector acceleration signals $b_{body}$ and $b_{wheel}$ representative of both the direction and the magnitude of the accelerations of the body and wheel, respectively. Such acceleration signals are generated in response to the interaction of the vehicle body and wheel with an uneven road surface depicted generally as a function h(t). The vehicle body acceleration signal $b_{body}$ is processed according to equation 1) above to generate an intermediate signal $U_0$ via an absolute value generator 109, a differentiator 108, a coefficient multiplier 107, a summation (or subtraction) element 210 and a limiting circuit 106.

Substantially in parallel, an intermediate signal $U_1$ is generated via a coefficient multiplier 111, a summation (or subtraction) element 212 and another limiting circuit 110. The wheel acceleration $b_{wheel}$ sensed by accelerometer 206 is processed according to equation 3) set forth above to produce the intermediate signal $U_2$ via an absolute value generator 115, a summation (or subtraction) element 214, a coefficient multiplier 114, a coefficient multiplier 113 and a still further limiting circuit 112. The coefficient $A_5$ employed in coefficient multiplier 113 is, in turn, derived according to equation 5) above as a function of the wheel acceleration produced by a sample and hold circuit 119, which is driven at a sampling frequency f which is at least equal to or greater than twice the resonant frequency of the wheel $f_{wheel}$ (resonance). Sample and hold circuit 119 may preferably incorporate memory circuitry and comparitor circuitry for maintaining in memory the greatest wheel acceleration produced over an appropriately chosen period of time.

The three generated intermediate signals $U_0$, $U_1$ and $U_2$ are all multipled together in a multiplier element 105, and the resulting product is limited in limiting circuitry 104, such that, preferably, its value ranges between about 0.1 and about 1.0. The thus limited product signal, designated in FIG. 5 as $U_3$, is then introduced into a proportional current generating circuit 103. For example, intermediate signal $U_3$ could be a voltage representative signal, and current generating element 103 could be a voltage controlled current source, e.g., transistor circuit well known in the art which generates a proportionately representative current signal $I_1$ in response thereto.

The absolute value of the wheel acceleration produced by absolute value generator 115 is also further processed, substantially in parallel, to produce a second intermediate current signal $I_2$, according to equation 4) above, via coefficient multiplier 118, summation (or subtraction) element 216, limiting circuitry 117 and an additional voltage controlled proportional current source 116.

A constant reference current $I_0$ is introduced into addition (or subtraction) element 218, wherein signal $I_2$ is subtracted from reference signal $I_0$ to partially produce the vibration damper control signal I.

In Evaluation Circuit 1, discussed more fully in connection with FIG. 6, the body and wheel accelerations are integrated to yield the body and wheel velocities $V_{body}$ and $V_{wheel}$, respectively. Testing is then, conducted to determine whether both of the following conditions are met: a) whether the wheel velocity exceeds or at least equals the body velocity, and b) whether the directions of the two velocities are identical. If both of these conditions are met, then the value of the intermediate signal $I_1$ is set to 0. In other words, in such a case, the constant reference signal $I_0$ is not further reduced by the value of the intermediate signal $I_1$. Otherwise, if both of the above conditions are not met, the value of the intermediate signal $I_1$ is set to its actual processed value, and the value of the constant reference signal $I_0$ is further reduced by this processed value $I_1$ in addition (or subtraction) element 218.

The value of the calculated control signal I is appropriately limited in a still further limitation circuit 121 between maximum and minimum values $I_{max}$ and 0, appropriately set according to the range of possible adjustment of the vibration damping apparatus being employed.

As noted above, the vibration damping apparatus 208 preferably, exhibits a variable damping characteristic, preferably in response to a variable control current signal I. One possible such variable damping apparatus is disclosed in U.S. Pat. No. 4,749,069, issued Jun. 7, 1988 to Knecht, et al. and entitled "Vibration Damper for Motor Vehicles having an Arrangement for Varying Damping Thereof", patent is hereby expressly incorporated by reference with the same effect as if the entire contents thereof were expressly set forth herein.

Even more preferably, the vibration damping apparatus 208 will have a damping characteristic which is variable between a relatively stiff damping characteristic $K_S$ and a relatively soft damping characteristic $K_K$. Additionally, in an even more preferred embodiment, the vibration damping apparatus 208 includes means for setting, either manually or otherwise, the damping characteristic limits $K_S$ and $K_K$. Still further, in a particularly preferred embodiment, the vibration damping apparatus 208 includes circuitry (e.g., limit indicators and a potentiometer) 220 which generates signals representative of the currently set damping characteristic limits $K_S$ and $K_K$.

The damping force characteristic $K_A$ actually applied by vibration damping apparatus 208 is, therefore, in general, a function of $K_S$, $K_K$ and I. Moreover, the damping force characteristics need not be absolutely linear functions, but may be nonlinear and may vary additionally with respect to time, etc. In general, the actual applied damping force characteristic $K_A$ will be a member of the general family of characteristics represented as:

$$K_A = K_S - (K_S - K_K) \times K_1 \times I$$

In FIG. 5, this general family of damping characteristics is schematically represented by a proportional conversion element 122, which includes time delay means dependent upon T1 and T2, multiplication circuitry 123 and a proportional conversion element 124, incorporating time delay means dependent upon T3 and T4.

Dependent upon the control current I, the damping characteristic limit signals $K_S$ and $K_K$ provided by limit indication means 220, and appropriately determined parameters K1, T1, T2, T3, and T4, the damping characteristics of vibration damping apparatus 208 are, therefore, appropriately set between the applicable limits.

Referring now to FIG. 6, preferably, Evaluation Circuit 1 of FIG. 5 includes a computer circuit (e.g., a commercially available microprocessor), appropriately programmed to perform the functions schematically and algorithmically depicted in FIGS. 4 and 5.

The acceleration vector signals produced by sensors 204 and 206 are digitized in A/D converters 130 and 140, and the outputs thereof are integrated in integrators 150 and 160, respectively, to determine the corresponding vector velocities. The directions and magnitudes of these velocities are separated in elements 170, 180, 190 and 200, and in comparator 210, it is determined whether the absolute value of the wheel velocity equals or exceeds the absolute value of the body velocity, while, in element 220, it is determined whether the vehicle body and wheel are both moving in the same direction, i.e., up or down. The logical outputs of elements 210 and 220 are then introduced into a NAND gate 230, the output of which is fed to the switching element 102 shown in FIG. 5.

Referring again to FIG. 5, there, the wheel suspension of a vehicle wheel of a vehicle is simulated by means of a two mass system. The weight of the vehicle body is represented by $m_{body}$, the wheel mass by $m_{wheel}$, the spring constant of the vehicle body by $c_{body}$ and the spring constant of the vehicle wheel by $c_{wheel}$. The unevenness of the road is designated h(t). The vibration damper is described by the damping force constant $K_A$, which is, in turn, influenced by the valve control current I.

In the Evaluation Circuit 1, a switching criterion is derived to activate the analog circuit 102. The vehicle always runs on the lowest damping force characteristic, if the following conditions are fulfilled: 1) the velocity of the wheel is greater than the velocity of the vehicle body, and 2) the direction of the unit vectors of the wheel and of the body are identical. For this purpose, the wheel acceleration and the vehicle body acceleration are determined by sensors, and processed by the Evaluation Circuit 1, shown in greater detail in FIG. 6. In practice, to fulfill these conditions, a critical value circuit and a hysteresis (or memory circuit) may be permitted. If the criterion is fulfilled, switch circuit 2 is opened, such that the current $I_1$ equals zero, and the valve current is determined only by the current $I_0$ and by the current $I_2$.

If the switching criterion is not fulfilled, the damping force is continuously set by the control circuit $I_1$. This control circuit $I_1$ is formed by the multiplication of the voltages $U_0$, $U_1$ and $U_2$ in the multiplier 105 and the voltage current transformation in the proportional element 103. For example, a voltage controlled current source, such as a transistor circuit, well known in the art, could be utilized for proportional element 103. The limiters 104, 106, 110, 112 and 117 limit the output voltages to within a defined range. For example, this range in FIG. 4 is shown normalized to between 0.1 and 1. $U_0$ is calculated from the absolute value of the vehicle body acceleration 109, the differentiator 108, the coefficient multiplier 111 and the constant $X_1$. $U_1$ is calculated from the absolute value of the vehicle body acceleration 109, the coefficient multiplier 107 and the constant $X_2$.

The influence of the roadway is taken into consideration by the vehicle wheel acceleration in the coefficient divider 113, the coefficient multiplier 114, the constant X$_3$, the absolute value generation of the wheel acceleration 115, the maximum value memory 119 and the frequency generator 120.

Since the damping force characteristics do not, as a rule, follow a linear path, there are different comfort actions for different roadway profiles. This influence can be corrected by means of the coefficient divider 113, the maximum value memory 119 and the frequency generator 120. In the additional sample and hold circuit 119, the maximum wheel acceleration for the half-period of the wheel resonant frequency is buffered, and transmitted to the coefficient divider 113 to correct the control voltage U$_2$.

The safety of the vehicle is determined, among other things, by the dynamic wheel load fluctuations. Severe wheel accelerations caused by the roadway also increase the wheel load fluctuations. In the proportional element 116, from the limiter 117, the constant X$_4$, and the coefficient multiplier 118 and the absolute value of the vehicle wheel acceleration 115, therefore, a control current I$_2$ is calculated, which continuously increases the damping force with increasing wheel acceleration.

For the realization of the control apparatus, an adjustment valve is necessary, which produces a proportional action between the hardest damping force characteristic K$_S$ and the minimum valve current, e.g. I=0, and the softest damping force characteristic K$_K$ and the maximum valve current I$_{max}$. The damping force characteristics need not be linear. For example, the damping force constant K$_A$ for any random point in the family of characteristics can be calculated from:

$$K_A = K_S - (K_S - K_K) \times K \times I.$$

The damping force constant of the vehicle body K$_A$ is to the control current I, whose amplitude can be limited in the limiter 121 to a desired range, e.g., between about 0 and about I$_{max}$. The regulation of the adjustment valve is described in the proportional element with a delay 122 by K$_1$, T$_1$ and T$_2$. The temporal action of a vibration damper is taken into consideration in an additional proportional element with delay 124 by T$_3$ and T$_4$.

FIG. 6 illustrates the processing of the velocity signals V$_{body}$ and V$_{wheel}$ from the measured acceleration signals b$_{body}$ and b$_{wheel}$. The analog signals are digitized by means of the A/D converters 130 and 140, and then further processed in a computer (e.g. a microcomputer). After integration of the digital signals in the integrators 150 and 160, the mathematical signs (i.e. the direction of the unit vectors E) are evaluated, each in a vectorizer 170 and 180. In the comparator 220, the output signal now becomes logical "high", if both mathematical signs are the same. The absolute value of the velocities is calculated in the absolute value generation 190 and 200, and compared in the comparator 210. A critical value and hysteresis can be programmed. The output signal from the comparator 210 is only logical "high" if the comparison is true. The output signal of the NAND function 230 activates the analog switch 102, as shown in FIG. 5.

In summing up, an example of a situation how the present invention may be used resides in a apparatus for the computer-assisted control, as a function of the roadway, of vibration dampers of a vehicle suspension system, with sensors attached to the vehicle and/or to vibration dampers which emit electrical signals which characterize the unevenness of the roadway, with an evaluation circuit (computer) which receives the sensor signals and produces from them the actuating signals for the vibration dampers, which exhibit a wide spread of the family of characteristics between a very low damping force and a very high damping force. The evaluation Circuit 1 converts the sensor signals b$_{body}$ and b$_{wheel}$ into signals and transmits them analog circuit 102 receiving the absolute generation 109 of the car body acceleration and the absolute generation 115 of the car wheel acceleration, whereby the summing point forms, from the current I$_1$ of the absolute generations (109 and 115) of body acceleration and the car wheel acceleration, the current I$_2$ of an absolute value generation 115 of the car wheel acceleration, and a constant current I$_0$, an activating signal for a valve and/or an "n"-number of digital valves of the vibration damper, such that the lowest damping force characteristic is engaged when the velocity of the wheel V$_{wheel}$ is greater than the velocity of the car body V$_{body}$ and the direction of the unit vector E$_{wheel}$ of the wheel is the same as the direction of the unit vector E$_{body}$ of the car body.

A further example of where the present invention may be utilized resides in the fact that the proportional valve has a proportional action between a high damping force characteristic K$_{Sport}$ at a low current I$_{min}$, and low damping force characteristic K$_{Comfort}$ at a high current I$_{max}$.

A yet further example of where the present invention may be utilized resides in the fact that the sensor signals b$_{body}$ and b$_{wheel}$, after digitization in an A/D/ converter 130, 140, are integrated in the Evaluation Circuit 1 into an integral 150, 160 and the mathematical signs are evaluated in a vectorizer 170, 180 and transmitted to a comparator 220, whereby, in absolute value generators 190, 200, the appropriate amount of the velocity V is calculated, and compared in the comparator 210, so that, with the same mathematical signs of the unit vectors E in the comparator 220 and a true comparison of velocities V in the comparator 210, the output signals of the comparator 220 and the comparator 210 are logical "high", and in the NAND function 230, produce an output signal to activate the analog circuit 102.

In summary, one feature of the invention resides broadly in a valve arrangement for a hydraulic, adjustable vibration damper with a piston which is attached to a piston rod and which sub-divides the work cylinder into two work chambers which are filled with damping medium and whereby a valve arrangement is utilized regarding to at least in one part control the damping force, and is planned with at least two electromagnetically operated valves each with an electric connection line, are characterized by the fact that the connection line 1 ends in a valve 3 and electric wire leads 5 for all valves 3, 4 are shown and that beginning with this valve 3 the connecting leads 2 are placed for the remaining valve(s) 4.

Another feature of the invention resides broadly in a valve arrangement characterized by the fact that the connecting line 1 and/or feeder line 2 are connected to the valves 3, 4 by means of a plug connection 7, 6.

Yet another further feature of the invention resides broadly in a valve arrangement characterized by the fact that the electric connection line 1 and/or feeder line 2 are sprayed with elastic material 8 in the area of valves 3, 4.

Still yet another further feature of the invention resides broadly in a valve arrangement characterized by the fact that the electric connection line 1 and/or feeder line 2 are sprayed with elastic material 8 such as an elastomer, in the area of valves 3, 4.

A further feature of the invention resides broadly in a valve arrangement characterized by the fact that the electric connecting line 1 for one valve 3 and the feeder lines 2 for the remaining valves 4 are arranged adjacent and approximately parallel to each other.

A yet further feature of the invention resides broadly in a valve arrangement characterized by the fact that the electric connection of the electric connecting line 1 and/or the feeder line 2 occurs on the inside of valve 3.

Yet another feature of the invention resides broadly in a valve arrangement characterized by the fact that the electric connecting line 1 and feeder line 2 are electrically connected and are consolidated in plug connection 7.

Some examples of vibration dampers include U.S. Pat. No. 4,749,070, entitled "Hydraulic Vibration Damper Having Adjustable Damping Valve" and U.S. Pat. No. 4,723,640, entitled "Adjustable Hydraulic Vibration Damper."

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications, and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. An adjustable hydraulic vibration damper having an electrically operated valve system, said damper comprising:
    a working cylinder comprising a damping fluid and a damping piston, said damping fluid and said damping piston being disposed within said working cylinder;
    a first solenoid valve and a second solenoid valve, both for controlling the flow of damping fluid in said damper, each of said first solenoid valve and said second solenoid valve being externally mounted on said working cylinder and connected thereto; and
    means for controlling said first solenoid valve and said second solenoid valve comprising:
        a first connection line extending to said first solenoid valve;
        said first connection line comprising a plurality of electrical leads disposed therewithin;
        at least one of said plurality of electrical leads of said first connection line being configured for transmitting electrical signals to said first solenoid valve to control said first solenoid valve;
        at least one other of said plurality of electrical leads of said first connection line being configured for transmitting electrical signals to said second solenoid valve to control said second solenoid valve;
        a second connection line extending directly from said first solenoid valve to said second solenoid valve;
        said second connection line comprising at least one electrical lead disposed therewithin;
        said at least one other of said plurality of electrical leads of said first connection line being configured for being electrically connected, through said first solenoid valve, with said at least one electrical lead of said second connection line;
        at least one of said at least one electrical lead of said second connection line being configured for transmitting electrical signals to said second solenoid valve to control said second solenoid valve; and
        said first connection line and said second connection line being mounted externally of said working cylinder.

2. The damper according to claim 1, further comprising:
    a first plug element being slidably connectable with said first solenoid valve for connecting said first connection line to said first solenoid valve, said first plug element being disposed at and electrically connected with an end of said first connection line;
    said first solenoid valve comprising a receptacle for slidably receiving said first plug element;
    a second plug element being connectable with said second solenoid valve for connecting said second connection line to said second solenoid valve, said second plug element being disposed at and electrically connected with an end of said second connection line; and
    said second solenoid valve comprising a receptacle for slidably receiving said second plug element.

3. The damper according to claim 2, wherein at least one of said first connection line and said second connection line comprises a supplementary resilient material for facilitating flexible bending of said at least one of said first connection line and said second connection line.

4. The damper according to claim 3, wherein said supplementary resilient material is sprayed on said at least one of said first connection line and said second connection line, in the vicinity of at least one of said first plug element and said second plug element.

5. The damper according to claim 4, further comprising:
    said first solenoid valve comprising a connecting element, said receptacle of said first solenoid valve being disposed at said connecting element;
    said second connection line extending from said connecting element of said first solenoid valve; and
    said plurality leads of said first connection line being parallel to said at least one lead of said second connection line at said connecting element of said first solenoid valve.

6. The damper according to claim 5, wherein said receptacle of each of said first and second solenoid valves comprises a plurality of male contacts.

7. The damper according to claim 6, wherein said first plug element and said second plug element comprise gripping contacts for mating with said male contacts of said receptacle of each of said first and second solenoid valves.

8. The damper according to claim 7, wherein said first solenoid valve is configured for receiving said first plug element at an orientation generally parallel to a longitudinal direction of said working cylinder.

9. The damper according to claim 8, further comprising:
- said second solenoid valve comprising a connecting element, said receptacle of said second solenoid valve being disposed on said connecting element; and
- said connecting element of said second solenoid valve is configured for receiving said second plug element at an orientation offset at an acute angle from the longitudinal direction of said working cylinder.

10. The damper according to claim 9, further comprising:
- said working cylinder comprising clamp means mounted at an external area thereof, said clamp means being configured for holding in place a portion of said first connection line and orienting said first connection line generally parallel to said working cylinder in the vicinity of said clamp means;
- said first connection line comprising an outer casing, said plurality of leads being disposed within said outer casing;
- said second connection line comprising an outer casing, said at least one leads being disposed within said outer casing;
- each of said first plug element and said second plug element comprising a first cylindrical portion, a conical portion, a second cylindrical portion and a flared portion;
- said receptacle of said first solenoid valve comprising a cylindrical area for receiving a portion of said first plug element;
- said first cylindrical portion of said first plug element being configured for being disposed about, and for gripping, said cylindrical area of said receptacle of said first solenoid valve;
- said conical portion of said first plug element extending away from said first cylindrical portion;
- said second cylindrical portion of said first plug element being disposed at a tapered end of said conical portion, such that said first cylindrical portion has a diameter generally greater than that of said second cylindrical portion;
- said flared portion of said first plug element being disposed at an end of said second cylindrical portion and having a diameter generally greater than that of said second cylindrical portion;
- said flared portion of said first plug element being configured to facilitate grasping thereof for manually removing said first plug element from said connecting element of said first solenoid valve;
- said first plug element having a recessed area at said first cylindrical portion to accommodate said cylindrical area of said receptacle of said first solenoid valve;
- said first plug element comprising a sealing ring mounted flush with said recessed area for abutting said cylindrical area of said receptacle of said first solenoid valve;
- said outer casing of said first connection line extending through said flared portion and said second cylindrical portion of said first plug element;
- said connecting element of said first solenoid valve comprising a second cylindrical area at which said second connection line initiates;
- said second connection line being parallel to said first connection line at said second cylindrical area;
- said second plug element for being oriented at an angle of about 45° with respect to the longitudinal direction of said working cylinder when said second plug element is mated with said receptacle of said second solenoid valve;
- said receptacle of said second solenoid valve comprising a cylindrical area for receiving a portion of said second plug element;
- said first cylindrical portion of said second plug element being configured for being disposed about, and for gripping, said cylindrical area of said receptacle of said second solenoid valve;
- said conical portion of said second plug element extending away from said first cylindrical portion;
- said second cylindrical portion of said second plug element being disposed at a tapered end of said conical portion, such that said first cylindrical portion has a diameter generally greater than that of said second cylindrical portion;
- said flared portion of said second plug element being disposed at an end of said second cylindrical portion and having a diameter generally greater than that of said second cylindrical portion;
- said flared portion of said second plug element being configured to facilitate grasping thereof for manually removing said second plug element from said connecting element of said second solenoid valve;
- said second plug element having a recessed area at said first cylindrical portion to accommodate said cylindrical area of said receptacle of said second solenoid valve;
- said second plug element comprising a sealing ring mounted flush with said recessed area for abutting said cylindrical area of said receptacle of said second solenoid valve; and
- said outer casing of said second connection line extending through said flared portion and said second cylindrical portion of said first plug element.

11. Valve system for an adjustable hydraulic vibration damper, the damper comprising a working cylinder, said valve system being electrically operated and comprising:
- a first solenoid valve and a second solenoid valve, both for controlling the flow of damping fluid in said damper, each of said first solenoid valve and said second solenoid valve being externally mounted on said working cylinder and connected thereto; and
- means for controlling said first solenoid valve and said second solenoid valve comprising:
  - a first connection line extending to said first solenoid valve;
  - said first connection line comprising a plurality of electrical leads disposed therewithin;
  - at least one of said plurality of electrical leads of said first connection line being configured for transmitting electrical signals to said first solenoid valve to control said first solenoid valve;
  - at least one other of said plurality of electrical leads of said first connection line being configured for transmitting electrical signals to said second solenoid valve to control said second solenoid valve;

a second connection line extending directly from said first solenoid valve to said second solenoid valve;

said second connection line comprising at least one electrical lead disposed therewithin;

said at least one other of said plurality of electrical leads of said first connection line being configured for being electrically connected, through said first solenoid valve, with said at least one electrical lead of said second connection line;

at least one of said at least one electrical lead of said second connection line being configured for transmitting electrical signals to said second solenoid valve to control said second solenoid valve; and said first connection line and said second connection line being mounted externally of said working cylinder.

12. The valve system according to claim 11, further comprising:

a first plug element being slidably connectable with said first solenoid valve for connecting said first connection line to said first solenoid valve, said first plug element being disposed at and electrically connected with an end of said first connection line;

said first solenoid valve comprising a receptacle for slidably receiving said first plug element;

a second plug element being connectable with said second solenoid valve for connecting said second connection line to said second solenoid valve, said second plug element being disposed at and electrically connected with an end of said second connection line; and said second solenoid valve comprising a receptacle for slidably receiving said second plug element.

13. The valve system according to claim 12, wherein at least one of said first connection line and said second connection line comprises a supplementary resilient material for facilitating flexible bending of said at least one of said first connection line and said second connection line.

14. The valve system according to claim 13, wherein said supplementary resilient material is sprayed on said at least one of said first connection line and said second connection line, in the vicinity of at least one of said first plug element and said second plug element.

15. The valve system according to claim 14, further comprising:

said first solenoid valve comprising a connecting element, said receptacle of said first solenoid valve being disposed at said connecting element;

said second connection line extending from said connecting element of said first solenoid valve; and said plurality leads of said first connection line being parallel to said at least one lead of said second connection line at said connecting element of said first solenoid valve.

16. The valve system according to claim 16, wherein said receptacle of each of said first and second solenoid valves comprises a plurality of male contacts.

17. The valve system according to claim 16, wherein said first plug element and said second plug element comprise gripping contacts for mating with said male contacts of said receptacle of each of said first and second solenoid valves.

18. The valve system according to claim 17, wherein said first solenoid valve is configured for receiving said first plug element at an orientation generally parallel to a longitudinal direction of said working cylinder.

19. The valve system according to claim 18, further comprising:

said second solenoid valve comprising a connecting element, said receptacle of said second solenoid valve being disposed on said connecting element; and said connecting element of said second solenoid valve is configured for receiving said second plug element at an orientation offset at an acute angle from the longitudinal direction of said working cylinder.

20. The valve system according to claim 19, wherein the working cylinder comprises clamp means mounted at an external area thereof, the clamp means being configured for holding in place a portion of said first connection line and orienting said first connection line generally parallel to the working cylinder in the vicinity of the clamp means, said valve system further comprising:

said first connection line comprising an outer casing, said plurality of leads being disposed within said outer casing;

said second connection line comprising an outer casing, said at least one leads being disposed within said outer casing;

each of said first plug element and said second plug element comprising a first cylindrical portion, a conical portion, a second cylindrical portion and a flared portion;

said receptacle of said first solenoid valve comprising a cylindrical area for receiving a portion of said first plug element;

said first cylindrical portion of said first plug element being configured for being disposed about, and for gripping, said cylindrical area of said receptacle of said first solenoid valve;

said conical portion of said first plug element extending away from said first cylindrical portion;

said second cylindrical portion of said first plug element being disposed at a tapered end of said conical portion, such that said first cylindrical portion has a diameter generally greater than that of said second cylindrical portion;

said flared portion of said first plug element being disposed at an end of said second cylindrical portion and having a diameter generally greater than that of said second cylindrical portion;

said flared portion of said first plug element being configured to facilitate grasping thereof for manually removing said first plug element from said connecting element of said first solenoid valve;

said first plug element having a recessed area at said first cylindrical portion to accommodate said cylindrical area of said receptacle of said first solenoid valve;

said first plug element comprising a sealing ring mounted flush with said recessed area for abutting said cylindrical area of said receptacle of said first solenoid valve;

said outer casing of said first connection line extending through said flared portion and said second cylindrical portion of said first plug element;

said connecting element of said first solenoid valve comprising a second cylindrical area at which said second connection line initiates;

said second connection line being parallel to said first connection line at said second cylindrical area;

said second plug element for being oriented at an angle of about 45° with respect to the longitudinal direction of said working cylinder when said second plug element is mated with said receptacle of said second solenoid valve;

said receptacle of said second solenoid valve comprising a cylindrical area for receiving a portion of said second plug element;

said first cylindrical portion of said second plug element being configured for being disposed about, and for gripping, said cylindrical area of said receptacle of said second solenoid valve;

said conical portion of said second plug element extending away from said first cylindrical portion;

said second cylindrical portion of said second plug element being disposed at a tapered end of said conical portion, such that said first cylindrical portion has a diameter generally greater than that of said second cylindrical portion;

said flared portion of said second plug element being disposed at an end of said second cylindrical portion and having a diameter generally greater than that of said second cylindrical portion;

said flared portion of said second plug element being configured to facilitate grasping thereof for manually removing said second plug element from said connecting element of said second solenoid valve;

said second plug element having a recessed area at said first cylindrical portion to accommodate said cylindrical area of said receptacle of said second solenoid valve;

said second plug element comprising a sealing ring mounted flush with said recessed area for abutting said cylindrical area of said receptacle of said second solenoid valve; and said outer casing of said second connection line extending through said flared portion and said second cylindrical portion of said first plug element.

* * * * *

UNITED STATES PATENT AND TRADEMARK OFFICE
CERTIFICATE OF CORRECTION

PATENT NO. : 5,251,728
DATED : October 12, 1993
INVENTOR(S) : Jochen MUND and Wilfried KRAMER It is certified that error appears in the above-indentified patent and that said Letters Patent is hereby corrected as shown below:

On title page, item [63], after 'Jun.", delete "9" and substitute --29--.

In column 1, line 25, after 'arrangement', insert --is provided to control the damping force. The valve arrangement--.

In column 11, line 49, after 'the', insert --high-speed--.

In cloumn 12, line 9, after 'them', insert --to an--.

In column 12, line 14, after 'of', insert --the car--.

In column 12, line 17, after 'a', insert --proportional--.

UNITED STATES PATENT AND TRADEMARK OFFICE
CERTIFICATE OF CORRECTION

PATENT NO. : 5,251,728
DATED : October 12, 1993
INVENTOR(S) : Jochen Mund and Wilfried Kramer It is certified that error appears in the above-indentified patent and that said Letters Patent is hereby corrected as shown below:

Column 17, line 59, claim 16, after claim delete "16" and substitute --15--.

Signed and Sealed this

Sixth Day of September, 1994

Attest:

BRUCE LEHMAN

*Attesting Officer*   *Commissioner of Patents and Trademarks*